(12) United States Patent
Gschwind et al.

(10) Patent No.: US 7,243,333 B2
(45) Date of Patent: Jul. 10, 2007

(54) METHOD AND APPARATUS FOR CREATING AND EXECUTING INTEGRATED EXECUTABLES IN A HETEROGENEOUS ARCHITECTURE

(75) Inventors: Michael Karl Gschwind, Chappaqua, NY (US); Kathryn M. O'Brien, South Salem, NY (US); John Kevin O'Brien, South Salem, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 10/280,244

(22) Filed: Oct. 24, 2002

(65) Prior Publication Data

US 2004/0083462 A1     Apr. 29, 2004

(51) Int. Cl.
G06F 9/44      (2006.01)
G06F 9/30      (2006.01)

(52) U.S. Cl. ..................... 717/107; 712/203
(58) Field of Classification Search ........ 717/140–155; 707/200; 719/317
See application file for complete search history.

(56) References Cited

U.S. PATENT DOCUMENTS

| | | | |
|---|---|---|---|
| 4,882,674 A | 11/1989 | Quint et al. | |
| 5,339,430 A | 8/1994 | Lundin et al. | |
| 5,659,701 A * | 8/1997 | Amit et al. | ................. 719/317 |
| 5,664,159 A | 9/1997 | Richter et al. | |
| 5,684,955 A | 11/1997 | Meyer et al. | |
| 5,761,137 A | 6/1998 | Johnson et al. | |
| 5,812,848 A | 9/1998 | Cohen | |
| 5,960,466 A | 9/1999 | Belgard | |
| 6,006,248 A | 12/1999 | Nagae | |
| 6,077,312 A | 6/2000 | Bates et al. | |
| 6,119,247 A | 9/2000 | House et al. | |
| 6,138,209 A | 10/2000 | Krolak et al. | |
| 6,145,119 A | 11/2000 | House et al. | |
| 6,157,960 A | 12/2000 | Kaminsky et al. | |
| 6,202,200 B1 | 3/2001 | House et al. | |
| 6,209,061 B1 | 3/2001 | Nelson et al. | |
| 6,219,803 B1 | 4/2001 | Casella et al. | |
| 6,427,234 B1 | 7/2002 | Chambers et al. | |
| 6,430,600 B1 | 8/2002 | Yokote | |
| 6,446,137 B1 * | 9/2002 | Vasudevan et al. | ......... 719/330 |
| 6,480,818 B1 | 11/2002 | Alverson et al. | |

(Continued)

OTHER PUBLICATIONS

Orr et al., "OMOS- An Object Server for Program Execution", © 1992, IEEE, p. 200-209.

(Continued)

*Primary Examiner*—Wei Zhen
*Assistant Examiner*—Chih-Ching Chow
(74) *Attorney, Agent, or Firm*—Carr LLP; D'Ann N. Rifai

(57) ABSTRACT

The present invention provides a compilation system for compiling and linking an integrated executable adapted to execute on a heterogeneous parallel processor architecture. The compiler and linker compile different segments of the source code for a first and second processor architecture, and generate appropriate stub functions directed at loading code and data to remote nodes so as to cause them to perform operations described by the transmitted code on the data. The compiler and linker generate stub objects to represent remote execution capability, and stub objects encapsulate the transfers necessary to execute code in such environment.

25 Claims, 3 Drawing Sheets

U.S. PATENT DOCUMENTS

| | | | |
|---|---|---|---|
| 6,526,491 | B2 | 2/2003 | Suzuoki et al. |
| 6,671,746 | B1 | 12/2003 | Northrup |
| 6,704,842 | B1 | 3/2004 | Janakiraman et al. |
| 6,735,601 | B1 * | 5/2004 | Subrahmanyam ........... 707/200 |
| 6,738,977 | B1 | 5/2004 | Berry et al. |
| 6,760,907 | B2 | 7/2004 | Shaylor |
| 6,779,049 | B2 | 8/2004 | Altman et al. |
| 2002/0078308 | A1 | 6/2002 | Altman et al. |
| 2002/0144241 | A1 | 10/2002 | Lueh |
| 2004/0083455 | A1 * | 4/2004 | Gschwind et al. .......... 717/120 |
| 2004/0205697 | A1 * | 10/2004 | Hylands et al. ............. 717/106 |

OTHER PUBLICATIONS

"Chapter 7: Linking", © 1998 Micro Focus Limited, p. 1-11.

Winner, "Naming and Binding in a Vertical Migration Environment", © 1988 IEEE, p. 599-607.

Implementing a component architecture on multiple distributed object frameworks—Ben-Shaul, I.; Gish, J.W.; Robinson, W.; Enterprise Distributed Object Computing Workshop, 1998. EDOC '98. Proceedings. Second International, Nov. 3-5, 1998; pp. 319-329.

Experience with secure multi-processing in Java—Balfanz, D.; Distributed Computing Systems, 1998. Proceedings. 18th International Conference on, May 26-29, 1998; pp. 398-405.

A toolkit for detecting and analyzing malicious software—Weber, M.; Schatz, M.; Geyer, D.; Computer Security Applications Conference, 2002. Proceedings. 18th Annual, Dec. 9-13, 2002; pp. 423-431.

Debugging protocol for remote cross development environment—Seungwoo Son; Chaedeok Lim; Neung-Nam Kim; Real-Time Computing Systems and Applications, 2000. Proceedings. Seventh International Conference on Dec. 12-14, 2000; pp. 394-398.

Reflections on remote reflection—Richmond, M.; Noble, J.; Computer Science Conference, 2001. ACSC 2001. Proceedings. 24th Australasian, Jan. 29-Feb. 4, 2001; pp. 163-170.

Tanenbaum, "Structured Computer Organization", 1984, Prentice-Hall, Inc., p. 10-12.

* cited by examiner

```
/* invoke default_apu_function from MPU 130 to load and start code compiled for
   execution of the APU*/
#include<apu_xfer.h>
void
default_apu_function (int apuno)
{
    static char apu_text[]={...};
    static char apu_data[]={...};
    apu_transfer_block(apuno, 116, apu_text, 172);
    apu_transfer_block(apuno,32768, apu_data, 16);
    apu_start_exec(apuno, 116);
}
```

FIG. 3A

```
class apu_root_function
{
public:
    a
    virtual int spu_load(which_apu=ANY_APU);
    virtual int spu_load_data(which_apu=ANY_APU);
    virtual int spu_load_text(which_apu=ANY_APU);
    virtual int spu_xfer_parm(which_apu=ANY_APU, parm_descriptor myparms);
    virtual int spu_start(which_apu);
    virtual int spu_retrieve_results(which_apu)
};
```

FIG. 3B

METHOD AND APPARATUS FOR CREATING AND EXECUTING INTEGRATED EXECUTABLES IN A HETEROGENEOUS ARCHITECTURE

CROSS-REFERENCE TO RELATED APPLICATIONS

This application relates to co-pending U.S. patent applications entitled "METHOD AND APPARATUS FOR SETTING BREAKPOINTS WHEN DEBUGGING INTEGRATED EXECUTABLES IN A HETEROGENEOUS ARCHITECTURE" (application Ser. No. 10/280,677), "METHOD AND APPARATUS FOR OVERLAY MANAGEMENT WITHIN AN INTEGRATED EXECUTABLE FOR A HETEROGENEOUS ARCHITECTURE" (application Ser. No. 10/280,242) "METHOD AND APPARATUS FOR ENABLING ACCESS TO GLOBAL DATA BY A PLURALITY OF CODES IN AN INTEGRATED EXECUTABLE FOR A HETEROGENEOUS ARCHITECTURE" (application Ser. No. 10/280,187); and "METHOD AND APPARATUS FOR MAPPING DEBUGGING INFORMATION WHEN DEBUGGING INTEGRATED EXECUTABLES IN A HETEROGENEOUS ARCHITECTURE" (application Ser. No. 10/280,243), filed concurrently herewith and having the same inventors, Michael Karl Gschwind, Kathryn O'Brien, John Kevin O'Brien, and Valentina Salapura.

TECHNICAL FIELD

The invention relates generally to multiprocessing and, more particularly, to the standardization of the passing of information between a plurality of processors.

BACKGROUND

Parallel processing, which generally comprises employing a plurality of microprocessors coupled to the same computer system to concurrently process a batch of data, is of great importance in the computer industry. Generally, there are three major types of parallel processing. These are parallel processing systems employing shared memory or distributed memory or a combination of the two. Typically, shared memory is memory that can be accessed in a single operation, such as a "load" or "read" command, by a plurality of processors. Distributed memory is memory that is localized to an individual processor. In other words, in a distributed system, each processor can access its own associated memory in single access operation, but typically cannot access memory associated with the other processors in a single operation. Finally, there is a hybrid, or "heterogeneous," parallel processing, in which there is some system memory accessible by one or more processors, and some memory which is distributed and local to at least one processor.

One such example of a hybrid parallel processor system comprises at least one reduced instruction set (RISC) main processor unit (MPU), such as a PowerPC™ processor, and at least one specialized or "attached" processor unit (APU), such as a Synergistic™ APU (SPU). Typically, the MPU is employed to execute general purpose code, wherein the general purpose code comprises complex control flows and orchestrating the overall hybrid parallel processing function. The MPU has access to the full range of system memory. The APU is generally directed to executing dataflow operations. In other words, the APU calculates highly repetitive multimedia, graphics, signal or network processing workloads which are identified by high compute to control decision ratios. In conventional hybrid systems, APUs do not have access to the system memory, and their own memory, the local store, is typically smaller than the shared memory.

Generally, while employment of the hybrid system provides high computational performance, it poses significant challenges to the programming model. One such problem relates to the APU. The APU cannot directly address system memory. Therefore, any code to be run on the APU has to be transferred to an associated local storage of the APU before this code can be executed on the APU. Furthermore, the APU and the MPU can have different instruction sets.

However, in the program design process, conventional compilers generally do not assign information sequences, such as specific code sequences or data, to be run on a PU or an APU in a hybrid system. Instead, programmers determine how to allot code functionality to the APU or the MPU. This allotment of code to a processor typically entails inefficiencies in the programming process. Furthermore, there is no standard programming "tool box" for passing information, be it text (that is, code) or data, between the attached processor and the main processor. Therefore, programmers typically have no standard format for passing this information sequences, thereby also creating inefficiencies in the programming process.

Therefore, what is required is a programming environment that allows for systematized programming of an MPU and an APU, and the transference of code and data between the MPU and the APU, that overcomes the deficiencies of conventional systems.

SUMMARY

The present invention provides for compiling and using code for employment in a distributed computing system. The code is partitioned into a plurality of modules, wherein the modules comprise at least one main processor code module and at least one attached processor code module. Code is selected to be encapsulated within at least one main processor code module, wherein the selected code is targeted for employment by at least one attached processor. At least one main processor code module and at least one selected attached processor code module are compiled. A stub function is generated from the selected at least one attached processor module. The compiled processor code targeted for the main processing module is linked to the at least one stub function. A linked object integrated executable program is created.

BRIEF DESCRIPTION OF THE DRAWINGS

For a more complete understanding of the present invention, and the advantages thereof, reference is now made to the following Detailed Description taken in conjunction with the accompanying drawings, in which:

FIG. 3A depicts "C" programming language pseudo-code for a stub function that is employable to transfer data from the MPU to the APU; and FIG. 3B depicts "C++" programming language pseudo-code for a stub function that is employable to transfer data from the MPU to the APU.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
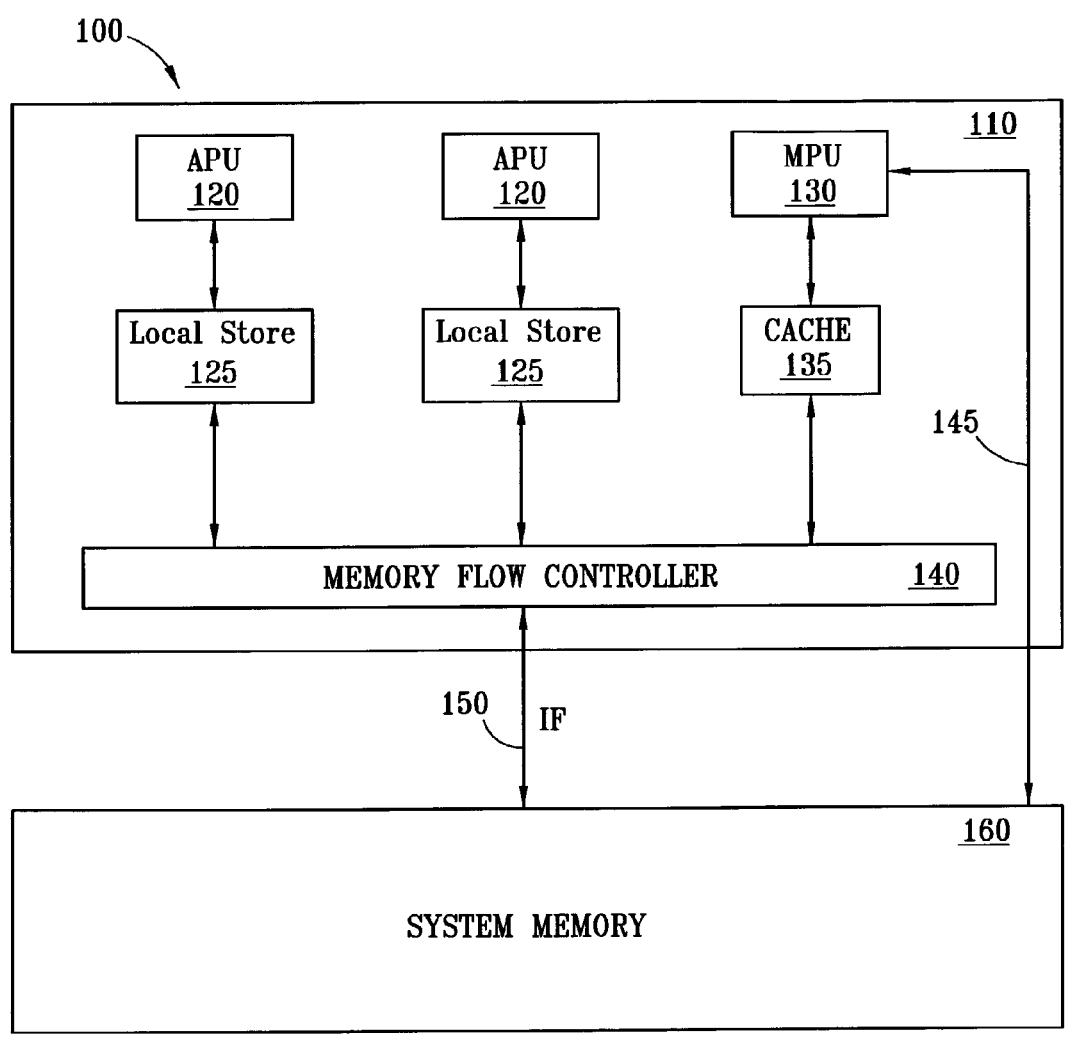
FIG. 1 schematically depicts a distributed processing system environment for executing integrated executables comprising stub functions.

Referring to FIG. 1, the reference numeral 100 generally designates heterogeneous parallel processing architecture that provides an environment for the passing of information by employment of a stub function. The architecture 100 comprises distributed computing environment 110 and a shared system memory 160, both of which are electrically coupled by an interface 150. The environment 110 comprises a plurality of APUs 120, each with its respective local store 125. The environment 110 further comprises an MPU 130, such as a RISC processor, and its level one cache 135. In one embodiment, the MPU 130 is coupled to the system memory 160 through a signal path 145. In one embodiment, the APU comprises an SPU. In one embodiment, a single MPU 130 is employed. In a further embodiment, a plurality of MPUs 130 are employed.

The environment 110 further comprises a memory flow controller (MFC) 140. Generally, the MFC 140 enables the movement of data and synchronization capability between the MPU 130 and the APU 120 processors, and provides for data transfer between the main system memory 160 and local storage 125. In FIG. 1, the MFC 140 is coupled to the system memory 160 through the interface 150.

Generally, the MFC 140 enables the movement of information, both text (that is, code) and data, between the system memory 160 and the local store 125 of the APU 120, at the request of the main processor 130 or the APU 120. Because the APU 120 does not have direct access to the system memory 160, the MFC 140 transfers information between the system memory 160 and the local store 125 of the APU 120, at the request of a transfer function, such as stub function, running on either the APU 120 or the MPU 130. In one embodiment, the MFC 140 comprises a direct memory access (DMA) device.

The architecture 100 is an environment in which an executable program runs, wherein the executable program has a stub function or stub functions embedded within it. In the stub function, code and data to be employed by the APU 120 is encapsulated as a software "object." Generally, the stub function commands the MFC 140 to transfer information between two separate execution environments, such as the system memory 160 and the local store 125. The stub function enables the MPU 130 to stream code and data to the local store 125 of the APU 120 for processing, for the APU 120 to perform the processing, and for the APU 120 to then stream the processed data back to the MPU 130. This processing of the data and code performed by the APU 120 is invisible to the MPU 130, and allows the MPU 130 to concurrently perform other data processing or program flow control tasks concurrently.

Typically, the stub function commands the MFC 140 to stream both code and data to a designated address within the local store 125 of a selected APU 120 from the designated addresses in the system memory 160. The stub function also commands the MFC 140 to command the APU 120 to process the data. The command issued from the stub function to the APU 120 are remote commands. Generally, remote commands are commands that are sent from a first execution environment to a second execution environment. Typically, the stub function is the single entry point to the APU 120. In other words, the APU 120, or its associated local store 125, is typically only accessible through the stub function.

In a further embodiment, the streamed code also contains within it yet another stub function. This streamed stub function enables the APU 120 to command the MFC 140 to send processed data back to the shared memory 160 when the APU 120 has finished data processing. In this embodiment, a stub function in the MPU 130 polls the APU 125 to determine whether the APU 120 is finished processing. If the APU 120 is finished processing, then the stub function executed by the MPU 130 commands the MFC 140 to send the processed data back to the system memory 160. In yet another embodiment, all stub functions are executed by the MPU 130, as all stub functions reside in the system memory 160. However, not all MFC commands need necessarily be associated with stub functions.

Figure 2:
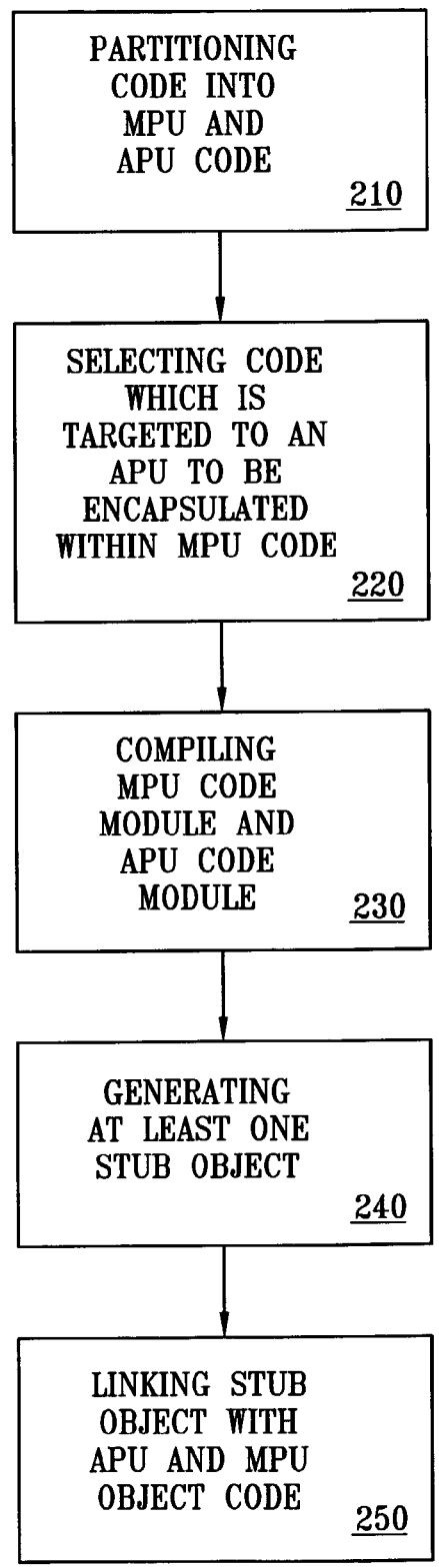
FIG. 2 illustrates a method for compiling and using code destined for a plurality of execution environments in the distributed computing system.

Turning now to FIG. 2, illustrated is a method 200 for compiling and using code, thereby creating an integrated executable with embedded stub functions. In step 210, source code is partitioned into modules to be run on both the APU 120 or APUs 120 and the MPU 130, thereby creating an APU 120 code module and an MPU 130 code module. The partitioning can be performed either by a compiler or through the intervention of a human programmer, or a combination of both approaches. The partitioning can be based upon such considerations as type of data manipulations required, repetitiveness of the data manipulation, and so on. Examples of modules to be run on the selected APU 120 are trigonometric functions, matrix manipulations, square root calculations, and so on.

In step 220, the compiler (or programmer) selects at least one separate APU 120 code module that is to be encapsulated within the MPU 130 code module or code modules. In step 230, the partitioned modules, written in a programming language, are compiled by a compiler. Some examples of programming languages are "C," "C++", and "Assembly" or "Assembler," although other programming languages are within the scope of the present invention. This compilation produces a plurality of object code modules tailored for execution in one or more of the separate processing architectures, such as the local store 125 of the APU 120 and the system memory 160 coupled to the MPU 130, or a plurality of MPUs 130.

A compiled object code module destined for one or more APUs 120 or one or more MPUs 130 can be the result of the combination of code or data originating from several different source files. Also, more than one object code section can include the same code or data. Generally, step 230 combines into one contiguous area all the code or data that can be loaded in one operation into the corresponding local store 125 of the selected APU 120. Furthermore, step 230 combines any files to be compiled into an object module for the MPU 130.

In step 240, the linker generates a stub function by encapsulating the at least one compiled module selected in step 220 as a stub function, wherein the stub function further comprises the means to transfer the code and data between the APU 120 and the MPU 130. The stub function comprises an "object," wherein both the code, the data, and the means for accessing the code and data are contained within the stub function. The means for streaming the data between the MPU 130 and the targeted APU 120 typically comprises commands to the MFC 140.

In step 250, the linker binds the at least one module destined for the APU 120, which has been encapsulated as a stub function within the module to be executed on the MPU 130 to any other compiled modules destined for the APU 120 or APUs 120. The linker binds the linked APU 120 compiled modules to the compiled module destined for the MPU 130. In one embodiment, the linker first links all the modules targeted to attached processors 120, then further links these linked modules to the module targeted for the MPU 130.

Turning now to FIG. 3A, disclosed is pseudo-code in the "C" programming language for a stub routine for transmitting information from the system memory 160 to the local store 125. The stub routine includes a header file "apu_xfer.h", which represents the interface specifications of the system-level operations necessary to effect MFC operations, such as moving a block of data, initiating execution, and so forth.

Generally, the stub function comprises a software "object" which further comprises embedded code and data to be streamed into the APU 120, along with the software means to transfer the code and data to the APU 120 from the system memory 160. In FIG. 3A, this code and data are the apu_text[] and the apu data[] arrays, respectively. Furthermore, in FIG. 3A, the stub function comprises two subfunctions. These are the apu_transfer_block( ) subfunction and the apu_start_exec( ) subfunction invocations referring to system-level operations defined by the header file "apu_xfer.h" in this exemplary embodiment.

Generally, the apu_transfer_block( ) subfunction commands the MFC 140 to send information, such as code and data, to a selected APU 120. The apu_transfer_block( ) subfunction comprises four fields of information within its header. In FIG. 3A, the first field of information, "apuno," is the indicia of the APU 120 to which the text and data is to be streamed. The second field of information comprises the memory address within the local store 125 of the APU 120 in which the information is to be stored. In FIG. 3A, this exemplary value is "116" for the first apu_transfer_block() subfunction, and "32768" for the second apu_transfer_block() subfunction. The third field comprises indicia, as to the text or data that is to be sent. In FIG. 3A this is apu_text[] and apu_data[], respectively. Finally, the length of the information is sent in the fourth field. These exemplary values are "172" for the apu_text and "16" for the apu_data fields, respectively.

The stub function of FIG. 3A further comprises a subfunction to start the selected APU 120 processing data. This subfunction, "apu_start_exec()," comprises two fields. The first field is indicia of the selected APU 120 upon which the processing is to initiate. The second field is the address of the text or executable code in the local store 125 of the selected processor 120. The address of the text of the executable code conveys to the selected APU 120 where to look in memory to start executing the streamed code.

Turning briefly to FIG. 3B, illustrated is a "C++" code class which can be used as a base class to derive stubs for different modules providing common member functions to load, transfer parameters, initiate execution, and retrieve results. In one exemplary embodiment, there is defined a public class function, that has a virtual int spu_load() subfunction, a virtual int spu_load_data() subfunction, and a virtual int spu_load_text() subfunction. In one embodiment, the spu_load() performs the functions of the spu_load_data() subfunction and the spu_load_text() subfunction. There is also virtual spu_xfer_parm () subfunctions.

In this exemplary embodiment, parameters are represented by a user-defined type parm_descriptor, which has been adequately defined to accommodate different sets of parameters which might be passed to a stub. In other embodiments, parameters can be passed using different conventions, such as by the use of the C/C++ "stdarg" facility. As is understood by those of skill in the art, "stdarg" is a part of the C language that standard deals with passing variable invocation-defined parameters {both variable in number and data type(s)} to a function. In yet another embodiment, each derived subclass from the base class apu_root_function may have its own invocation member function, which can also provide the parameters. Such function may then either directly effect the transfer of the parameters to the selected APU, or invoke a member function such as spu_xfer_parm(), or other functions to copy one or more data items to a local APU memory. There is also a sub function, virtual int spu_start(), to start the APU 120 processing the data, and another subfunction, virtual int spu_retrieve() subfunction, to fetch the processed data from the APU 120.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for compiling and using code in a distributed computing system, the method comprising:

partitioning source code into a plurality of modules, wherein the modules comprise at least one main processor code module and at least one attached processor code module;

Selecting code to be encapsulated within the at least one main processor code module, wherein the selected code is targeted for execution by at least one attached processor;

compiling the at least one main processor code module to execute on the at least one main processor and the at least one selected attached processor code module to execute on the at least one selected attached processor;

generating at least one stub function from the selected at least one attached processor module, wherein the at least one stub function comprises instruction code targeted for execution by the at least one main processor and the compiled at least one selected attached processor code module;

linking the at least one main processor compiled code module and the at least one stub function;

creating a linked object integrated executable; and employing the stub function to transfer information from a shared memory to the attached processor.

2. The method of claim 1, further comprising a step of polling the at least one attached processor as to whether it has finished employing information associated with the stub function.

3. The method of claim 1, further comprising a step of creating object code employable to retrieve a result of data processing performed by the attached processor on information associated with the stub function.

4. The method of claim 1, wherein the step of compiling further comprises determining the invocation subroutines for the transfer of data from at least one system memory to at least one attached processor unit.

5. The method of claim 1, further comprising a step of employing a memory flow controller to transfer information associated with the stub function from a system memory to the local storage of at least one attached processor.

6. The method of claim 1, further comprising a step of storing the linked stub object in a shared memory.

7. The method of claim 1, further comprising employing nodes on a network, the nodes comprising separate execution spaces.

8. The method of claim 1, wherein the step of partitioning is based upon guidance from a programmer.

9. The method of claim 1, wherein the step of partitioning is performed by a compiler.

10. A method for executing a computer program in separate execution environments, comprising:
    calling a stub function in a first execution environment, wherein the first execution environment is a main processing unit (MPU);
    calling a second function, wherein the second function is encoded in a second execution environment, wherein the second execution environment is an attached processing unit (APU), and wherein the calling comprises remote calling by the stub function; and
    wherein the stub function comprises instruction code targeted for employment in the first execution environment and the second function comprises encapsulated compiled text targeted to the attached processing unit and is loaded into the second execution environment under the control of the first execution environment.

11. The method of claim 10, wherein the step of remote calling by the stub function comprises passing data to at least one attached processor.

12. The method of claim 10, wherein the step of remote calling comprises transmitting an address in which to store the information in the local store.

13. The method of claim 10, wherein the step of remote calling comprises transmitting indicia of a selected one of a plurality of attached processor units.

14. The method of claim 10, wherein the step of remote calling comprises transmitting indicia of the size of the information to be transferred.

15. The method of claim 10, wherein the step of remote calling comprises accessing the corresponding address of the information to be transmitted from a shared memory as a shared memory address indicia contained with the stub function.

16. A parallel processor system adapted to employ an executable file, the parallel processor system comprising:
    at least one main processor;
    at least one attached processor; and
    the executable file, wherein the file is adapted to be executed by employ the at least one main processor, wherein the at least one main processor comprises a first execution environment, and the at least one attached processor, wherein the at least one attached processor comprises a second execution environment, the executable file further comprising at least one embedded stub function, wherein the at least one embedded stub function comprises instruction code targeted for execution by the at least one main processor and encapsulated compiled text targeted for execution by the at least one attached processor and is loaded into the second execution environment under the control of the first execution environment.

17. The parallel processor system of claim 16, wherein the at least one main processor and the at least one attached processor comprise a plurality of nodes.

18. The parallel processor system of claim 16, further comprising at least one memory flow controller, wherein the stub function is employable to control the memory flow controller to transfer indicia between a shared memory and a local store.

19. The parallel processor system of claim 16, further comprising a local store associated with each at least one attached processor.

20. The parallel processor system of claim 18, wherein the memory flow controller is further employable to provide for a data transfer between a main memory and a local storage.

21. The parallel processor system of claim 20, wherein the memory flow controller comprises a direct memory access device.

22. The parallel processor system of claim 16, wherein the main processor employs reduced instruction set architecture.

23. The parallel processor system of claim 16, wherein the main processor and the attached processor employ different instruction sets.

24. A computer program product for compiling and using code in a distributed computer system, the computer program product having a computer storage medium with a computer program embodied thereon, the computer program comprising:
    computer code for partitioning source code into a plurality of modules, wherein the modules comprise at least one main processor code module and at least one attached processor code module;
    computer code for selecting code to be encapsulated within the at least one main processor code module, wherein the selected code is targeted for execution by at least one attached processor;
    computer code for compiling the at least one main processor code module to execute on the at least one main processor and the at least one selected attached processor code module to execute on the at least one selected attached processor;

computer code for generating at least one stub function from the selected at least one attached processor module, wherein the at least one stub function comprises instruction code targeted for execution by the at least one main processor and the compiled at least one selected attached processor code module;

computer code for linking the at least one main processor compiled code module and the at least one stub function;

computer code for creating a linked object integrated executable program; and computer code for employing the stub function to transfer information from a shared memory to the attached processor.

25. A processor for compiling and using code in a distributed computer system, the processor including a computer program product having a computer storage medium with a computer program embodied thereon, the computer program comprising:

computer code for partitioning source code into a plurality of modules, wherein the modules comprise at least one main processor code module and at least one attached processor code module;

computer code for selecting code to be encapsulated within the at least one main processor code module, wherein the selected code is targeted for execution by at least one attached processor;

computer code for compiling the at least one main processor code module to execute on the at least one main processor and the at least one selected attached processor code module to execute on the at least one selected attached processor;

computer code for generating at least one stub function from the selected at least one attached processor module, wherein the at least one stub function comprises instruction code targeted for execution by the at least one main processor and the compiled at least one selected attached processor code module;

computer code for linking the at least one main processor compiled code module and the at least one stub function;

computer code for creating a linked object integrated executable program; and computer code for employing the stub function to transfer information from a shared memory to the attached processor.

* * * * *